June 14, 1960 — E. F. BLAND — 2,940,688
ROADABLE AIRCRAFT AND SAILBOAT
Filed Aug. 27, 1956 — 6 Sheets-Sheet 1

INVENTOR.
Edward F. Bland
BY T W Secrest
ATTORNEY

June 14, 1960

E. F. BLAND 2,940,688

ROADABLE AIRCRAFT AND SAILBOAT

Filed Aug. 27, 1956

INVENTOR.
Edward F. Bland
BY T W Secrest

ATTORNEY

June 14, 1960

E. F. BLAND 2,940,688

ROADABLE AIRCRAFT AND SAILBOAT

Filed Aug. 27, 1956

INVENTOR.
Edward F. Bland
BY T W Secrest

ATTORNEY

June 14, 1960  E. F. BLAND  2,940,688
ROADABLE AIRCRAFT AND SAILBOAT

Filed Aug. 27, 1956  6 Sheets-Sheet 6

INVENTOR.
Edward F. Bland
BY
T. W. Secrest
ATTORNEY

United States Patent Office 2,940,688
Patented June 14, 1960

2,940,688

ROADABLE AIRCRAFT AND SAILBOAT

Edward F. Bland, 10733 14th NE., Seattle, Wash.

Filed Aug. 27, 1956, Ser. No. 606,493

2 Claims. (Cl. 244—2)

This invention relates to a means of transportation and, more particularly, to such a means capable of transporting people on land, in the air and on water.

An object of this invention is the provision of a means of transportation which is capable of being transformed into an ambulator for moving on land, flying in the air and going through water.

An additional object is to provide such a means for transportation which is capable of being operated with a minimum of instruction to an operator and is easily operated.

A still further object is the provision as such means for traversing distances either by land, air or water and which means is comparatively inexpensive to manufacture.

These and other objects and advantages of the invention are realized by the elements embodying the invention as illustrated in the following description.

Figure 3:
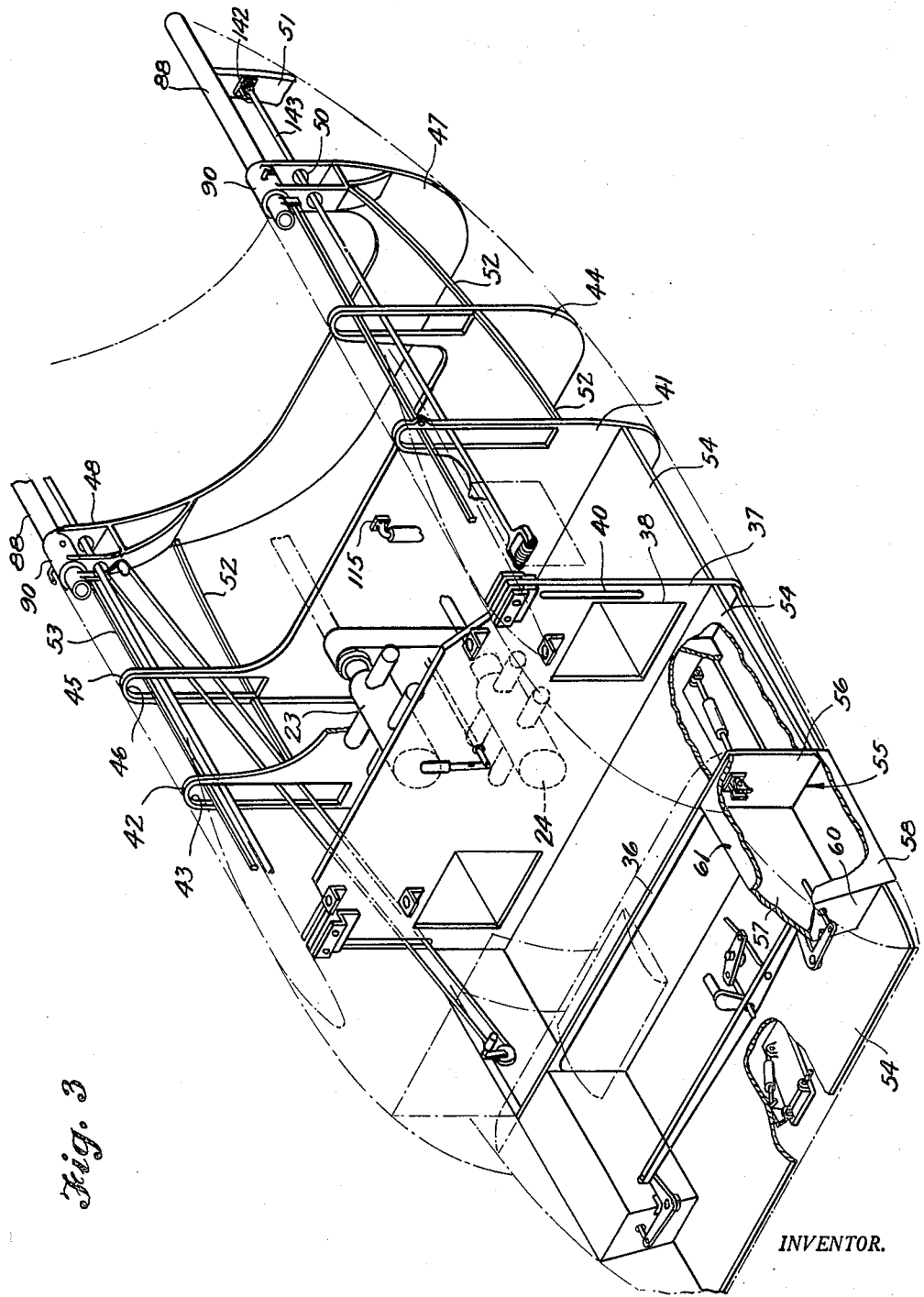

Fig. 3, on an enlarged scale, is a fragmentary perspective view of the invention without the skin thereby showing the bulkheads and the arrangement of some of the working elements in the ambulator.

Figure 4:
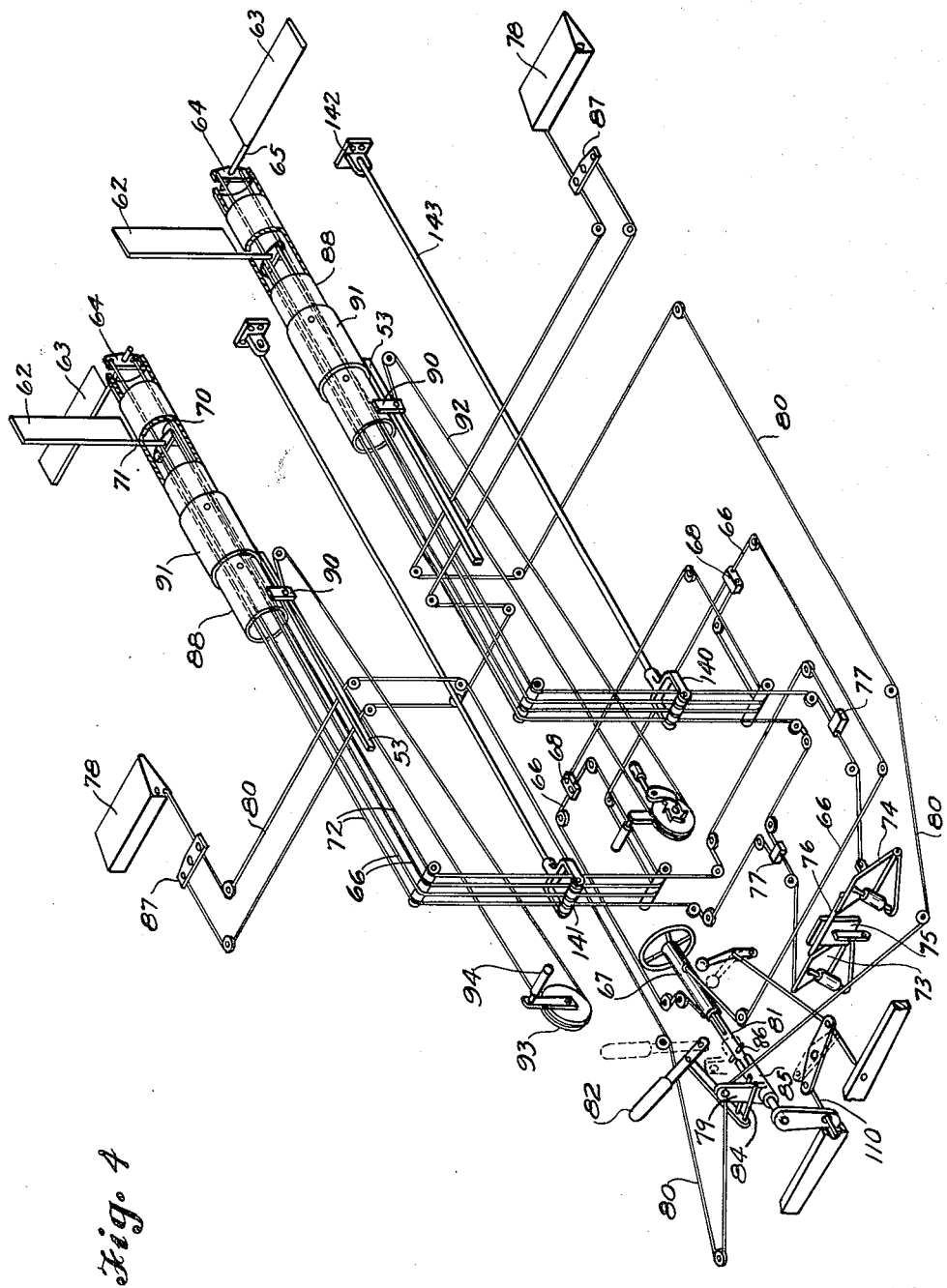

Fig. 4 is a perspective view of the aileron and elevator controls for the airplane portion of the invention.

Fig. 5 is a perspective view of the power plant and related components for rotating the propeller and driving the driving wheel.

Figure 6:
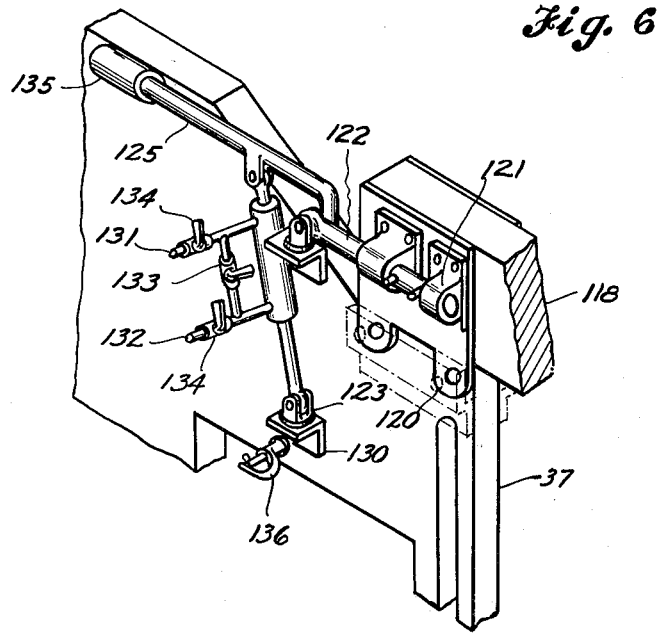

Fig. 6 is a perspective view of the means for raising the wings and illustrates these means with the wings in an outstretched attitude and in an upright position.

Figure 7:
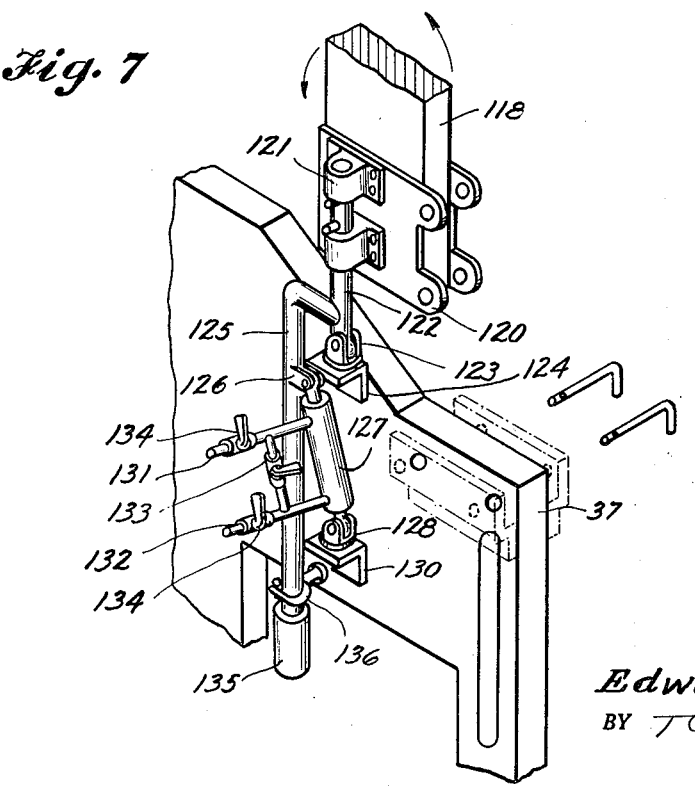
Figure 8:
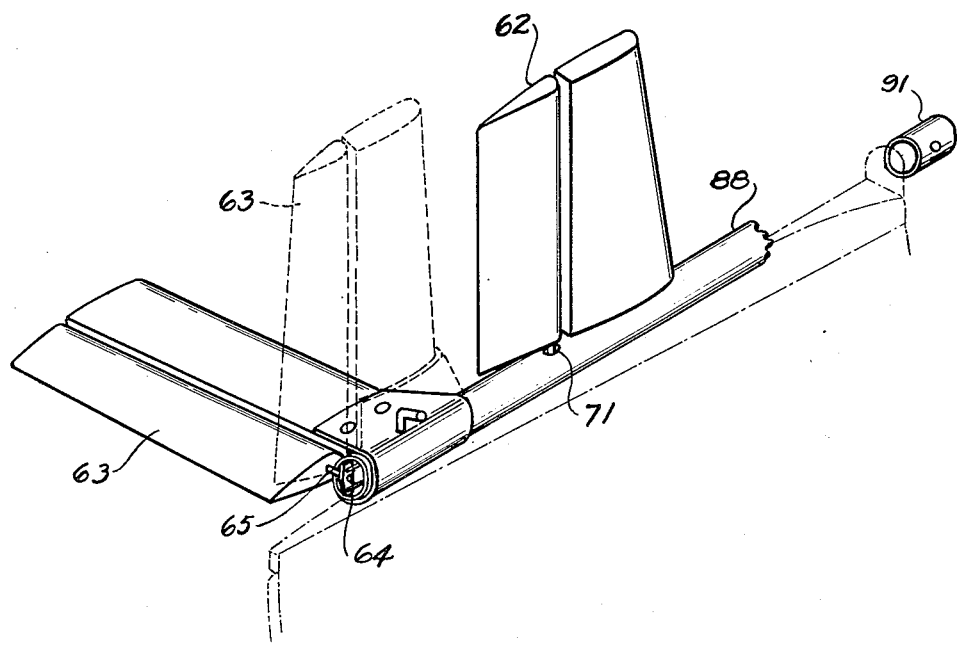

Fig. 7 is a perspective view of the means for raising the wings and illustrates these means with the wings in an upright posture so as to function as a sail for catching the wind and moving the ambulator in the water; and, Fig. 8 is a fragmentary perspective view of the tail and stabilizer structure.

In my invention I have tried to fulfill the need of a means of transportation for use on the land, over the water and in the air. In addition, this invention possesses certain desirable features which are of an aid in the event of an engine failure while the means of transportation is operating on water.

Turning now to the invention and a general description of the same in a hull 10 I employ a basically stable wing airfoil having a leading edge 11 which is straight horizontally and a trailing edge which is reflexed upwardly into a semi-circle 12. In a rear elevation view this trailing edge is of a crescent configuration. A combination of certain aerodynamic, hydrodynamic, propulsive features and storage space for the wings exist in this design to provide an efficient aircraft, a desirable boat and a compact and roadable means of transportation. Normally, wing airfoils used as a fuselage in this manner have an undesirable aerodynamic characteristic of "flattening out" so that they are parallel to the ground or water whenever they are one chord length away from the ground or water, thereby over-riding the elevator control force administered by the pilot. However, my wing airfoil does not possess this undesirable characteristic as the radii reflects the trailing edge of the wing and does not permit such a build-up of compression of air because of the semi-circle trailing edge. Because of this trailing edge the aircraft is stable and susceptible to positive elevator control. Other desirable properties flowing from this type of trailing edge are prevention of a person accidentally walking into the propeller while rotating and also the prevention of damage to the propeller upon the aircraft striking water. Also, as is readily appreciated this radii trailing edge prevents water from getting into the propeller arc.

Because a good airfoil having a trailing edge in the configuration of a semi-circle does not have the necessary hull-step to assist the hull of the ambulator plane in a "step" when used as an airplane I have provided skis to assist in the take-off of the aircraft. Two of these skis 16 are located below the center of gravity and on either side, laterally speaking, of the hull, and a third ski 17 is located on the center line of the aircraft and underneath the nose, viz., ski 17 is located forwardly of the skis 16. In this arrangement the nose ski 17 does not project as far downwardly as do the two main skis 16. Upon take-off and when the throttles are open the nose ski, being far ahead of the center of gravity of the aircraft, raises the nose almost immediately out of the water thereby permitting air to work in and underneath the fuselage airfoil section while the two main skis are lifting the aircraft up and out of the water so that sufficient lift may be obtained for the take-off operation. While planing for take-off the nose ski is clear of the water at higher speed thereby reducing unnecessary drag. These three skis retract into and project from water-tight wells within the hull so that they do not cause aerodynamic drag while the airplane is in flight. All three are retracted and protracted simultaneously by their individual hydraulic jacks which are controlled by the pilot operating a lever in the cockpit to raise or lower the same. Hydraulic pressure is supplied to these jacks by an engine driven pump. These skis may also be used to an advantage in traversing snow country. For example, by leaving the skis just a little way above the landing gear wheel line steering of the ambulator can be maintained by a front wheel 20 and a rear wheel 21. In this arrangement the skis support most of the weight of the aircraft while on the snow and the propeller propels the craft or the rear wheel propels depending upon whichever procedure is most advantageous in prevailing conditions of terrain.

In order to prevent torque and vibration from wracking the hull and possibly damaging the same, when employed as a roadable vehicle, I employ three wheels instead of four. The two front wheels 20 are used for steering, are retractable, are located forward of the center of gravity of the craft and function as water rudders when they are protracted in the water. They protract and retract hydraulically and lock in the down position by a lock operated hydraulically from the cockpit. Also, they have cover plates of a conventional type which cover most of the openings in the bottom of the hull whenever the wheels are retracted. The rear wheel, which retracts independently from the front wheels, also has a similar cover plate to cover the opening in the hull. As a precautionary measure for both the front wheels and the rear wheels, there is a small opening at the side of the wheelwell cover through which water drains upon the closing of the cover. The rear wheel is retracted mechanically by the pilot in the cockpit by the use of a crank and spool in the cockpit with a cable operating another spool on the landing gear leg which in turn operates a screw jack to raise or lower the gear. This will be described in more detail in a later part of this application. I employ this system as it is necessary to vary the angle-of-attack when operating as an airplane on the ground and when operating as a readable vehicle. More particularly, the airplane needs a positive angle-of-attack to take off and therefore I extend the rear wheel only a small distance below the fuselage for take-off; however, when the ambulator is used as a roadable vehicle the same angle cannot be employed as the same would tend to become airborne with increasing speed. Therefore, as a roadable vehicle, I extend the wheel further out of the hull to position the vehicle in a nose-down attitude so as to hold it on the ground at high speeds.

The rear wheel 21 has a water-wheel ring 22 bolted onto it so as to make the ambulator into a self propelling water craft. This is achieved in the water by positioning the rear wheel a sufficient distance below the hull to permit the lower portion of the water-wheel ring to be in water. As to the wheels all three of them are of the same size and are interchangeable by removing the water-wheel ring so as to be able to put it on another wheel occupying the rear wheel position.

The power plant for the ambulator comprises two air-cooled engines 23 and 24 with the former being positioned above the latter. These engines, as is seen from the drawings, are located aft of the pilot's compartment, and the upper engine 23 is connected in a direct drive to the propeller. This propeller 15 is driven by a shaft 25 which is enclosed within a tubular housing 26, and the propeller is located in the trough of the hull near the trailing edge of the fuselage wing. The lower engine 24 is used both to propel the ambulator as a readable vehicle and as a seacraft. During take-off additional power is required to help in this operation and therefore this lower engine is of great assistance as a booster source of power. In more detail, this lower engine 24 and the rear wheel 21 are connected by a clutch 27, a transmission 28, a gear reduction box 30, a drive shaft 31 and pinion gears 32 and 33. A drive or jack shaft 34 interconnects the rear wheel 21 and the pinion gear 33. In addition, this lower enginee 24 interconnects with the propeller drive shaft 25 by means of a chain drive and clutch. These are not directly shown but are in housing 35. Naturally, it is appreciated that this lower engine by means of this belt link chain drive assist in driving the propeller for a take-off, or, if the upper engine 23 is not functioning, then the lower engine can be used to drive the propeller. Under normal flight once the ambulator is air-borne the lower engine is disengaged and flight resumed on the upper engine alone.

In the drawings it is seen that the invention comprises an ambulator having a metal skin encasing structural members. These structural members in the main are vertical transverse bulkheads. More particularly, the leading or most forward bulkhead 36 is a dashboard, and hollow to lessen the weight of the craft. The next adjacent bulkhead 37 is of a substantially rectangular configuration having access openings 38 at approximately the center line and near the opposite edges. These access openings are of a square configuration. Also, near each edge and running from substantially the center of the bulkhead to nearly the upper edge is an elongated opening 40, the purpose of which will be explained in detail later. Proceeding rearwardly there is bulkhead 41 of a modified U-configuration. Running from substantially the horizontal center-line of the bulkhead and well into the ears are elongated openings which will be explained later. In back of the bulkhead 41 there is bulkhead 44 which is of a similar configuration of the former bulkhead and yet is of a more pronounced U-shape. On each side of the bulkhead 44 and running vertically upwardly are ears 45 and in which ears are elongated openings 46. Near the rear of the ambulator is a U-shaped bulkhead 47 having ears 48 on each side and extending upwardly vertically, and in each of these ears or legs is a circular opening 50. And, almost at the tip end of the ambulator is another bulkhead of a decidedly U-configuration or even of a crescent configuration. This bulkhead is denoted by reference numeral 51. From our examination of these bulkheads and the appreciation of the U-configuration it is readily seen that the upper inner surface decidedly dips downwardly in going from approximately the center of the ambulator to the rear. This dip makes it possible to have the propeller extend in a backward direction and also for the propeller to be protected from striking the object upon which it lands, namely, water when the ambulator is used as either a boat or for landing purposes. At the rear of the ambulator longitudinal braces are provided by spars 52 at substantially the mid-height of the craft and by spars 53 at substantially the upper edge of the craft. Longitudinal bracing for the front part of the craft is provided by floor sections 54 between the bulkheads 41 and 37, and forwardly of 37. Forwardly of the bulkhead 37 and on each side of the craft are front wheel wells 55. These wheel wells comprise a rear wall 56, oppositely facing side walls 57 and 58, a front wall 60 and a top or covering plate 61. For all practical purposes these front wheel wells are of a water tight construction except for the previously mentioned drainage provisions of the wheelwell cover.

Turning now to the aircraft portion of the ambulator it is seen that reference numeral 62 denotes the rudders and that 63 refers to the elevators. An elevator horn 64 is connected with the elevators by means of a rod 65, and a cable 66 interconnects the two elevators and also connects with steering mechanism 67. More particularly, this cable 66 connects with the elevator horn 64 and runs around pulleys so that by pushing the steering wheel forward the elevators swing downwardly and by pulling the steering wheel back the elevators swing upwardly. The elevators work in unison and rudders work in unison as respective pairs of control surfaces. The ends of this cable 66 are connected with the body of the cable 66 by links 68 so that there is a certain degree of tautness in the cable to assure of the actuation of the elevators upon the turning of the steering mechanism and the retraction of tail booms.

Returning to the rudder 62 the same connects with the rudder horn 70 by means of an interconnect rod 71. A cable 72 interconnects both of the rudder horns and control foot pedals. This cable can be of one continuous length which interconnects right foot pedal 73 and left foot pedal 74. These foot pedals may be actuated either singly or simultaneously by means of the control foot pedal 75 which connects with both 73 and 74 by interconnect link 76. The end of the cable 72 connects with the central part of the cable by means of interconnect links 77. There are provided ailerons 78 which are controlled by the steering mechanism 67 and which connect with the steering mechanism by means of a cable 80. This cable attaches to an aileron control lug 79 on a traveling jack shaft 85 which functions as interconnecting link between the ailerons and the steering wheel and which is adapted to move longitudinally on the steering mechanism shaft 81. Said traveling jack shaft is engaged and disengaged with the steering mechanism by means of a lever 82 which, when pulled backwardly, moves the jack shaft so as to interconnect the same with pins 86 on the steering assembly shaft 81. As is seen from the drawings fingers 84 on each side of the control lug 79 move this lug longitudinally of the shaft 81. And, the terminal ends of the cable 80 are connected with the main body of the cable by means of interconnect links 87.

The tail for the aircraft portion of the ambulator is provided by a tubular housing 88. This housing is adapted to be drawn into the body of the ambulator and is also adapted to be extended backwardly from the main body of the ambulator. As previously explained there are stabilizers and rubbers in this tail. Concerning ourselves now with the means for drawing within and projecting backwardly from the body of the ambulator there is provided a lug near the inner end of this tubular housing 88. The lug 90 is tack welded to the housing and is attached to a cable 92 which passes over a pulley 93. A sleeve 91 acts as a bearing for this housing and detachable pins hold housing 88 and sleeve 91 rigid when operated as aircraft in flight and as is seen in Figure 3 upon the pulling inwardly of the housing into the body of the ambulator the same passes through the passageways in the upper part of the bulkheads 41 and 44. The manner of actuating or moving the housing is readily apparent as the pulley 93 can be turned by handle 94 so as to either extend outwardly or withdraw inwardly the housing with respect to the body of the ambulator.

Proceeding now to the automotive side of the ambulator for traveling over land and roads it has previously been mentioned that there is a power plant supplying the driving force. This power plant comprises two engines, 23 and 24. The lower engine 24 connects with the clutch 27 which is controlled by a foot pedal 95 and a tie rod 96. Naturally, the depressing of the foot pedal disengages the clutch. The transmission 28 is controlled by the hand lever 97 which interconnects with the transmission by the tie rods 98 and linkage 100. The steering of the ambulator is controlled in a manner similar to that of an automobile as there is provided a steering mechanism 67 which has previously been explained. The steering mechanism connects with a drag link 101 by means of interconnect links 100 and 102 which is rotatably mounted on the shaft 81. On the outer end of each drag link 101 is a bell crank 103 for turning the wheels. This bell crank 103 connects with a tie rod 104 which in turn attaches to a lug 105 near the upper end of the wheel assembly. The wheel assembly includes a shock absorber system for smoothing out the ride and for improving the riding qualities of the ambulator. As is readily appreciated the turning of the steering wheel turns the front wheel in a corresponding direction so as to make is possible to steer the ambulator. There is also provided a means for raising and lowering the front wheels, namely control lever 106, which connects with the drag link by means of a connecting rod 107, a wishbone 108 and reciprocal links 109 and 110, said lever 106 locks the front wheels for take-offs and landings and disengages the steering wheel from steering control of front wheels. When lever 106 is in aft position steering control of the front wheels can be accomplished. To assist in the raising and the lowering of the wheels there is provided a hydraulic actuator 111 which, by means of hydraulic force, causes the wheels either to raise or to lower. Turning now to the rear wheel there is provided a means for both raising and lowering said wheel. This means comprises a pulley 112 and a cable 113 with the cable wrapping around a screw shaft 114 in the rear wheel assembly. Upon rotating this pulley in one direction the screw shaft is so actuated so as to force the wheel in a downwardly direction and, conversely, upon rotating the pulley in the other direction the screw shaft raises the rear wheel. This rear wheel raising and lowering assembly is connected to the bulkhead 44 on the forward side of the same by lugs 115 and 116. As the transmission of power from the lower engine 24 to the rear wheel has previously been presented the same will not be repeated.

In conjunction with the wheel assembly there is also related a ski assembly on the ambulator. This ski assembly may be used for assisting the ambulator in taking off from water as a seaplane or it may be used for traversing snowfields and the like. There are the three skis 16 and 17 with 17 being the forward ski in-between the skis 16, which are back of or rearward of 17. The skis may be raised or lowered by means of hydraulic actuators, ski 17 being raised and lowered by means of the hydraulic actuator 18 and the skis 16 being raised and lowered by means of hydraulic actuators 117. Manually operated retractable and protractable bumpers are provided for use for the roadable ambulator and for use as a seaplane. Prior to flight these bumpers are retracted to fair with the body lines. They are made of tubing and slide in tubes against coil springs for shock absorption.

Figure 1:
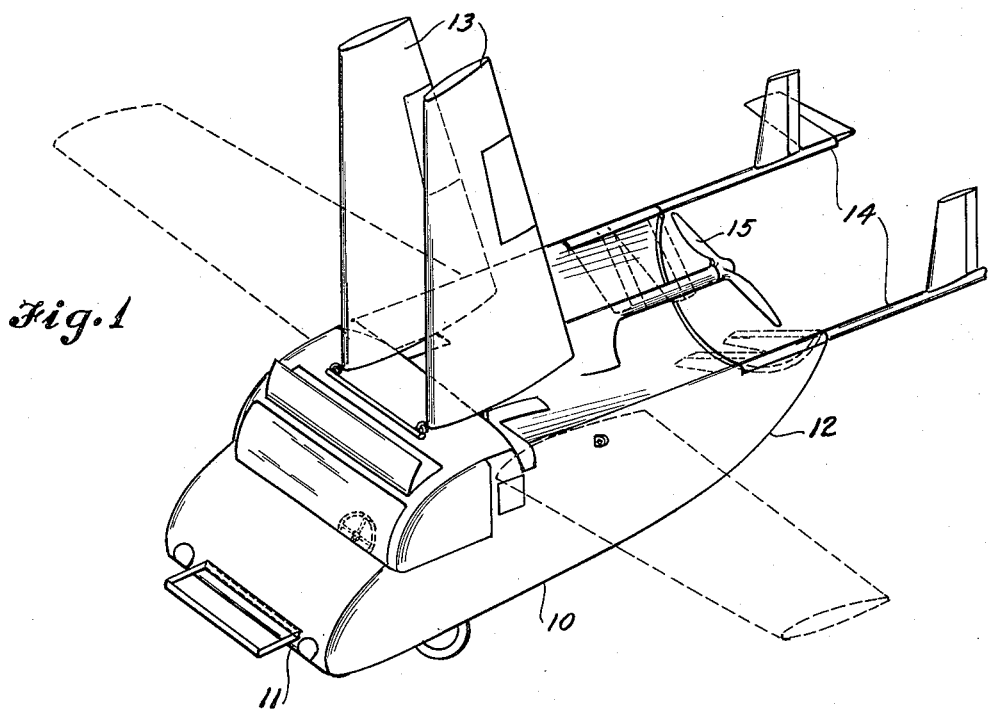
Figure 1 is a perspective view of a specific embodiment of the invention constructed in accordance with the preferred teaching of the invention, and illustrates by solid lines the wings in a raised vertical position for sailing conditions and by broken lines the wings in an extended horizontal position for flying conditions.
Figure 2:
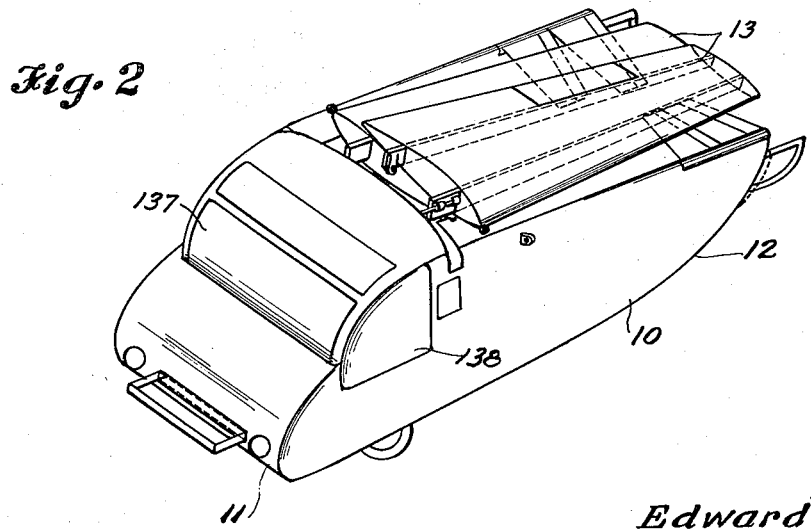
Fig. 2 is a perspective view of the invention with the wings folded on top of the ambulator and with the tail sections drawn into the body so that the ambulator can be driven on land.

The wings 13 are so constructed as to be used both as wings and sails, and can fold back in the recess in the upper backward part of the hulll of the ambulator. This is accomplished by the connection of a spar 118 to the main body of the ambulator or to the bulkhead 37 in the hull. More particularly, on the inner end of the spar, see Figures 6 and 7, there is attached a connecting plate 120 having bearings 121 for receiving the outer end of rod 122. The inner end of this rod is rotatably mounted, i.e. so as to allow the spar to swing in a vertical arc, and this is accomplished by mounting pivot 123 which in itself is adapted to rotate on its base 124. Spaced upwardly from the inner end of this rod 122 is a right angle rod which connects with this rod and then bends downwardly. This right angle rod is identified as by reference numeral 125. Near the right angle bend are outwardly projecting lugs 126 which connect with a hydraulic actuator 127 whose lower end is also mounted in a rotatable pivot 128 mounted on the mount 130. Said mount 130 is on the forward side of the bulkhead 37 and is at an elevation somewhat above the access opening 38. There are provided connecting lines for hydraulic fluid to actuate this hydraulic actuator 127. These connecting lines, 131 and 132 connect outside of the actuator at bypass valve 133. Hydraulic pressure for connecting lines 131 and 132 is derived from a hydraulic pump on the engines and passes through a hydraulic selector valve which can be turned on or off in the cockpit. Also there are valves 134 for controlling the flow of hydraulic fluid into and out of the actuator 127. On the lower end of the right angle rod 125 is a handle means 135 making it possible for a person, in case of an emergency such as a power failure or mechanical linkage failure, to grasp and move the wings. With this background it is possible to appreciate the manner in which the wings may be raised to be used as sails or else to be folded back into the recess of the ambulator. With the wings in a position so that the ambulator can be used as an aircraft the spar is horizontal and projects outwardly from the body. This is illustrated in Figure 6 which shows the spar as horizontal, the main body of the right angle rod 125 to be horizontal, and the actuator 127 to be extended. If it be desired to use wings as sails, see Figure 1, then the actuator 127 is so regulated as to raise the wings vertically. With the wings in a vertical position as depicted in Figure 7 the lower end of the right angle rod 125 may be permanently positioned by means of the locking mechanism 136 mounted on the forward side of the bulkhead 37 and just slightly above the access opening 38. In this position and with the ambulator floating on water it is possible for the same to be employed as a sail boat as these wings supply sufficient surface for catching the wind and propelling the boat. By lowering the front wheels water steerage is available. By opening the overhead transparent hatch and putting the wing leading edge interconnecting rod in place by placing a hook on each end into eyebolts in the leading edge of the wing, a controllable sail boat is in operation. The pilot can stand up in the cockpit and steer the wheel with his left hand and control angle of sails with his right hand, in order to tack or go with the wind. In those instances where it is desired to fold back the wings so as to protect them or to put them out of the way and therefore to use the ambulator as a land vehicle the locking mechanism 136 is unlocked and the handle 135 is grasped so as to raise the same forwardly and upwardly so as to fold back the wings. At the same time as the wings are being folded back the handle is twisted in a counter-clockwise direction to rotate the wings inwardly and so that the same overlap each other. As is seen this operation is performed by hand and is not performed by mechanical means.

Having now described my invention and the main features of the same I wish to refer to some of the auxiliary apparatus. As previously mentioned there are provided watertight wells for the wheels and the skis. The rear wheel well is somewhat larger in size than the two front wheel wells. This increase in size serves a particular advantage in the airplane portion of the ambulator and the taking off of the airplane as a seaplane from water. To more fully bring forth this advantage it is possible with this larger rear wheel well to flood the same to maintain the center of buoyancy slightly forward of the center of gravity for proper longitudinal trim of the ambulator. The forward ski gives a nose-up moment of force during take off and landing. (Center of gravity, for all practical purposes, remains practically constant in moment.) With this more easily planing of the hull there is a greater possibility of the air being caught underneath the hull and thereby making it possible to make the ambulator airborne in a shorter distance and also in a shorter space of time than if the hull did not plane as easily. Also there are provided windows and the like for seeing out of the ambulator. These are identified by reference numerals 137 and 138. In order to keep the cables 66 and 72 substantially taut and in position there is provided a keeper 140. This keeper includes a rotatable roll 141 against which the cables 66 and 72 press and are free to be moved without chafing. This keeper connects with a bulkhead 51 by means of a lug 142 and an elastic cord 143. This elastic cord 143 passes through the opening 50 and the bulkhead 47, opening 46 in the bulkhead 44, and opening 43 in the bulkhead 41. Controls and wheels brakes in the cockpit are conventional when used as an airplane. Left front brake is coupled to left rudder pedal. Right front brake is coupled to right rudder pedal. When the ambulator is roadable a third brake pedal 75 is mounted in between rudder pedals 73 and 74 so that rod 76 presses down on 73 and 74 simultaneously. Brake pedal 76 applies brake to rear wheel, giving three wheel brakes when roadable. Brake pedal 76 retracts rearwardly into a recess in floor board and is not used during take-offs, landings, nor in flight.

Having described my invention and illustrated the same in a working relation it is to be understood that my disclosure is to cover minor variations and equivalents.

What I claim is:

1. A roadable aircraft and sailboat having a body, said body having a lower edge which curves upwardly into an upper edge, said upper edge being on each side of the body and projecting backwardly from about the upper mid-part thereof, the upper surface of said body in the rearward part sloping downwardly and in going from one upward edge to the other upward edge cupping downwardly and then upwardly so as to form a troughlike, upper body surface, a propeller shaft projecting backwardly out of the upper body surface, a collapsible tail in each upper edge, said tail being capable of being extended backwardly out of the body and also being capable of being withdrawn into the body, a pair of wings positioned at approximately the mid-portion of the body, said wings being capable of being extended outwardly to be in the configuration of an airplane and also being capable of being folded back into the troughlike portion of the body, two spaced-apart wheel wells near the front of the body and a wheel well near the rear of the body, in each wheel well a wheel, and means to extend the wheels out of the wheel well and also to withdraw the wheels into the wheel well.

2. A roadable aircraft and sailboat having a water tight body portion, said body having an underside which curves upwardly and backwardly to meet an upper edge, there being an upper edge on each side of the body, the upper surface of said body in going backwardly from approximately the mid portion thereof sloping downwardly and the upper surface in going from one upper edge to the other upper edge sloping downwardly and then upwardly so as to form a troughlike, upper body surface, a collapsible tail in each open edge, said tail being extended backwardly out of the body and also being capable of being withdrawn into the body, a propeller shaft projecting rearwardly out of the troughlike portion, a pair of wings which may be extended upwardly in a vertical manner to function as sails, a wheel well in the rear and underneath side of the body portion, said wheel well having a wheel therein, a propelling means on said wheel for driving the roadable aircraft and sailboat through water, a power plant inside of the body, said power plant connecting with the wheel, and means to raise and lower said wheel in and out of the wheel well.

References Cited in the file of this patent

UNITED STATES PATENTS

| | | |
|---|---|---|
| 1,073,648 | Witzel | Sept. 23, 1913 |
| 1,727,275 | Diago | Sept. 3, 1929 |
| 2,194,596 | Henter | Mar. 26, 1940 |
| 2,573,271 | Perl | Oct. 30, 1951 |
| 2,606,519 | Branco | Aug. 12, 1952 |
| 2,681,773 | Rethorst | June 22, 1954 |
| 2,691,494 | Custer | Oct. 12, 1954 |
| 2,713,465 | Novinger | July 19, 1955 |
| 2,893,661 | Aylor | July 7, 1959 |